United States Patent
Yamamoto et al.

(10) Patent No.: US 9,181,378 B2
(45) Date of Patent: Nov. 10, 2015

(54) MODIFIED NATURAL RUBBER AND METHOD OF MANUFACTURING THE SAME, RUBBER COMPOSITION AND TIRE

(71) Applicant: BRIDGESTONE CORPORATION, Chuo-ku, Tokyo (JP)

(72) Inventors: Taku Yamamoto, Kodaira (JP); Haruki Minojima, Kodaira (JP); Takeshi Kasai, Kodaira (JP)

(73) Assignee: BRIDGESTONE CORPORATION, Tokyo (JP)

( * ) Notice: Subject to any disclaimer, the term of this patent is extended or adjusted under 35 U.S.C. 154(b) by 68 days.

(21) Appl. No.: 13/875,047

(22) Filed: May 1, 2013

(65) Prior Publication Data

US 2013/0296493 A1 Nov. 7, 2013

(30) Foreign Application Priority Data

May 1, 2012 (JP) ................................ 2012-104877

(51) Int. Cl.
| | | |
|---|---|---|
| *C08F 279/02* | (2006.01) | |
| *C08F 291/02* | (2006.01) | |
| *B60C 1/00* | (2006.01) | |
| *C08F 253/00* | (2006.01) | |
| *C08C 19/20* | (2006.01) | |
| *C08C 19/22* | (2006.01) | |
| *C08C 19/25* | (2006.01) | |
| *C08C 19/28* | (2006.01) | |
| *C08L 15/00* | (2006.01) | |

(52) U.S. Cl.
CPC .............. *C08F 253/00* (2013.01); *B60C 1/0016* (2013.04); *C08C 19/20* (2013.01); *C08C 19/22* (2013.01); *C08C 19/25* (2013.01); *C08C 19/28* (2013.01); *C08F 279/02* (2013.01); *C08F 291/02* (2013.01); *C08L 15/00* (2013.01)

(58) Field of Classification Search
None
See application file for complete search history.

(56) References Cited

U.S. PATENT DOCUMENTS

2006/0128879 A1* 6/2006 Maeda ..................... 524/575.5

FOREIGN PATENT DOCUMENTS

| | | | |
|---|---|---|---|
| EP | 2154192 A1 | | 2/2010 |
| EP | 2377892 A1 | | 10/2011 |
| EP | 2476708 A1 | | 7/2012 |
| JP | 58-152010 A | * | 9/1983 |
| JP | 5-287121 A | * | 11/1993 |
| JP | 6-329702 A | * | 11/1994 |
| JP | 9-25468 A | | 1/1997 |
| JP | 2004-123897 A | * | 4/2004 |
| JP | 2004-262973 A | | 9/2004 |
| JP | 2006-152171 A | * | 6/2006 |
| JP | 2006-188621 A | * | 7/2006 |
| JP | 2010-116472 A | * | 5/2010 |
| WO | WO 2010/055877 A1 | * | 5/2010 |
| WO | WO 2010/125124 A1 | * | 11/2010 |

OTHER PUBLICATIONS

European Patent Office Communication dated Jun. 9, 2015 issued in corresponding European application No. 13785186.1.

* cited by examiner

*Primary Examiner* — Robert Sellers
(74) *Attorney, Agent, or Firm* — Sughrue Mion, PLLC

(57) ABSTRACT

The present invention provides a modified natural rubber that offers higher efficiency of graft polymerization or attachment of a polar group-containing compounds, and that possesses excellent low loss factor, wear resistance and fracture resistance when used as a rubber composition, a rubber composition using the modified natural rubber and a tire using the rubber composition. In the present invention, a polar group-containing compound is graft polymerized or attached under mechanical shear force to a natural rubber raw material having a nitrogen content of 0.4 mass % or less.

5 Claims, 1 Drawing Sheet

MODIFIED NATURAL RUBBER AND METHOD OF MANUFACTURING THE SAME, RUBBER COMPOSITION AND TIRE

CROSS REFERENCE TO RELATED APPLICATIONS

This application is claiming priority based on Japanese Patent Application No. 2012-104877, filed May 1, 2012, the contents of which is incorporated herein by reference in its entirety.

TECHNICAL FIELD

The present invention relates to a modified natural rubber and a method of manufacturing the same, as well as a rubber composition and a tire using the modified natural rubber, and in particular, to a modified natural rubber that achieves highly efficient graft polymerization or attachment of a polar group-containing compound and possesses excellent low loss factor, wear resistance and fracture resistance when used as a rubber composition, and a method of manufacturing the same.

BACKGROUND ART

There is an increasing need for lower fuel consumption in automobiles and for tires with smaller rolling resistance. Thus, it is desirable to provide a rubber composition that has a low tan δ (hereinafter, referred to as a "low loss factor") and excellent low exothermic property as a rubber composition for use in tire treads, and so on. In addition, a rubber composition for treads is also required to have excellent wear resistance and fracture resistance in addition to the low loss factor. To this extent, it is effective to improve the affinity between a filler such as carbon black or silica and rubber components in a rubber composition for improved low loss factor, wear resistance and fracture resistance of the rubber composition.

For example, to improve the affinity between a filler and rubber components in a rubber composition and to enhance the reinforcing effect by the filler, a synthetic rubber with improved affinity for a filler by chain end modification, a synthetic rubber with improved affinity with a filler through copolymerization of functional group-containing monomers, and so on have been developed.

On the other hand, while natural rubber has been adopted abundantly making use of its superior physical properties, no technique has been established to improve natural rubber itself so that it has a greater affinity for a filler and to significantly enhance the reinforcing effect by the filler.

For example, some techniques have been proposed to epoxidize natural rubber, which, however, does not sufficiently improve the affinity between the natural rubber and a filler, and therefore fails to enhance the reinforcing effect by a filler adequately. In addition, other techniques are known to add a vinyl-based monomer to natural rubber latex for graft polymerization (see PTL 1-3 below), and the grafted natural rubber obtained by these techniques has already been produced as MG latex and the like. However, high purity latex is required to achieve high graft efficiency by these techniques. Accordingly, there is a problem that necessitates separate operation such as centrifugal separation, resulting in an increase in manufacturing costs.

As such, for the purposes of improving the reinforcing performance of and the affinity for a filler and reducing manufacturing costs, JP 2004-262973 A (PTL 4) discloses a rubber composition that is formed blending a modified natural rubber, which results from graft polymerization and subsequent coagulation and drying of a polar group-containing monomer onto natural rubber latex, with carbon black or silica. In addition, as a technique for reducing manufacturing cost, JP 2006-152171 A (PTL 5) discloses a modified natural rubber that is formed through graft polymerization or attachment of a polar group-containing compound to at least one natural rubber raw material selected from the group consisting of natural rubber under mechanical shear force, a natural rubber latex coagulation and a natural rubber cup lump.

The techniques disclosed in PTL 4 and PTL 5 allow production of a modified natural rubber at low cost that is capable of improving the low loss factor, wear resistance and fracture resistance of the rubber composition. However, the techniques of PTL 4 and PTL 5 need further improvement in terms of improvement of the efficiency of graft polymerization and attachment reaction between the natural rubber raw material and the polar group-containing compound.

CITATION LIST

Patent Literature

PTL 1: JP 5-287121 A
PTL 2: JP 6-329702 A
PTL 3: JP 9-025468 A
PTL 4: JP 2004-262973 A
PTL 5: JP 2006-152171 A

SUMMARY OF INVENTION (Technical Problem)

Therefore, an object of the invention is to provide a modified natural rubber that provides an improvement over the above-described prior art to optimize the natural rubber raw materials, and thereby offers higher efficiency of graft polymerization and attachment of polar group-containing compound, as well as excellent low loss factor, wear resistance and fracture resistance when used as a rubber composition, and a method for manufacturing the same. In addition, another object of the invention is to provide a rubber composition using such a modified natural rubber and a tire using the rubber composition.

(Solution to Problem)

The inventors have made various studies in order to achieve the above-mentioned objects, and as a result, the following findings have been obtained: such a modified natural rubber can be obtained that is capable of improving the low loss factor, wear resistance and fracture resistance of a rubber composition by graft polymerizing or attaching a polar group-containing compound to a solid natural rubber raw material which is available at low cost under mechanical shear force, and such a material that has a low protein content as compared to the conventional products may be used as the natural rubber raw material to reduce the reaction between the polar group-containing compound and the proteins in the raw material and improve the efficiency of graft polymerization and attachment. As a result, the present invention has been accomplished.

Specifically, an aspect of the present invention provides a modified natural rubber formed by graft polymerizing or attaching under mechanical shear force a polar group-containing compound to at least one natural rubber raw material selected from the group consisting of natural rubber, a natural rubber latex coagulation and a natural rubber cup lump, wherein the natural rubber raw material has a nitrogen content of 0.4 mass % or less.

In another preferred embodiment of the modified natural rubber of the present invention, the polar group-containing compound has a grafting or attaching amount of 0.01 to 5.0 parts by mass per 100 parts by mass of the solid rubber component in the natural rubber raw material.

In still another preferred embodiment of the modified natural rubber of the present invention, the polar group of the polar group-containing compound is at least one selected from the group consisting of amino group, imino group, nitrile group, ammonium group, imido group, amido group, hydrazo group, azo group, diazo group, hydroxyl group, carboxyl group, carbonyl group, epoxy group, oxycarbonyl group, nitrogen-containing heterocyclic group, oxygen-containing heterocyclic group, tin-containing group and alkoxysilyl group.

In addition, in yet another preferred example of the modified natural rubber, the modified natural rubber is formed through graft polymerization of the polar group-containing compound, and the natural rubber raw material includes a polymerization initiator which is not a conjugated system and which has a structure containing 5 to 10 carbon atoms in an alkyl chain extending from an atom radical-cleaving at one point to provide at least one radical.

Moreover, the polymerization initiator is more preferably at least one selected from t-butyl hydroperoxide, 1,1,3,3-tetramethylbutyl hydroperoxide, 1,1,3,3-tetramethylbutylperoxy-2-ethylhexanoate and t-hexylperoxy-2-ethylhexanoate, and particularly preferably t-butyl hydroperoxide and/or t-hexylperoxy-2-ethylhexanoate.

In addition, another aspect of the present invention provides a method of manufacturing a modified natural rubber, comprising: graft polymerizing or attaching a polar group-containing compound to at least one natural rubber raw material selected from the group consisting of natural rubber, a natural rubber latex coagulation and a natural rubber cup lump under mechanical shear force, wherein the natural rubber raw material has a nitrogen content of 0.4 mass % or less.

Moreover, in another preferred example of the method of manufacturing a modified natural rubber, the modified natural rubber is formed through graft polymerization of the polar group-containing compound, and a polymerization initiator which is not a conjugated system and which has a structure containing 5 to 10 carbon atoms in an alkyl chain extending from an atom radical-cleaving at one point to provide at least one radical is added to the natural rubber raw material.

Further, still another aspect of the present invention provides a rubber composition using the modified natural rubber, and yet another aspect of the present invention provides a tire comprising tire members and using said rubber composition in any of the tire members.

Advantageous Effect of Invention

The present invention may provide a modified natural rubber that offers higher efficiency in terms of graft polymerization and attachment of a polar group-containing compound and that possesses superior low loss factor, wear resistance and fracture resistance when used as a rubber composition, and a method of manufacturing the same. The present invention may also provide a rubber composition and a tire, each using the modified natural rubber and being excellent in low loss factor, wear resistance and fracture resistance.

BRIEF DESCRIPTION OF DRAWINGS

The present invention will be further described below with reference to the accompanying drawings, wherein.

Figure 1:
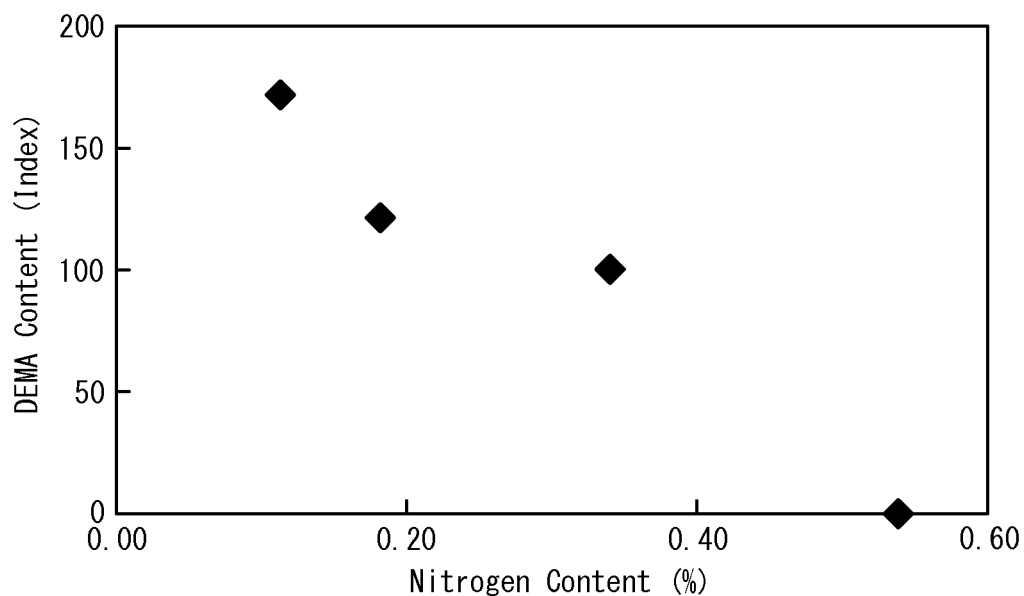
FIG. 1 is a graph illustrating the relationship between the nitrogen content in natural rubber raw materials and the DEMA (N,N-diethylaminoethylmethacrylate) content in examples and comparative examples.

DESCRIPTION OF EMBODIMENTS (Modified Natural Rubber, Rubber Composition)

Embodiments of the present invention will now be specifically described below.

A modified natural rubber of the present invention is formed by graft polymerizing or attaching a polar group-containing compound to at least one natural rubber raw material selected from the group consisting of natural rubber, a natural rubber latex coagulation and a natural rubber cup lump under mechanical shear force.

Since the polar group of the polar group-containing compound has excellent affinity for various fillers such as carbon black or silica, the modified natural rubber has high affinity for various fillers as compared to unmodified natural rubber. Accordingly, the rubber composition of the present invention using the modified natural rubber as a rubber component offers excellent fracture resistance and wear resistance and exhibits a significant improvement in low exothermal property (low loss factor), because of high dispersibility of a filler in the rubber component and a sufficient reinforcing effect provided by the filler.

Additionally, the natural rubber raw material used in the modified natural rubber of the present invention has a nitrogen content of 0.4 mass % or less.

The use of such a natural rubber raw material having a nitrogen content as low as 0.4 mass % or less and a low protein content as compared to the conventional ones allows inhibiting the reaction between the polar group-containing compound and the proteins contained in the raw material, thereby improving the efficiency of graft polymerization and attachment of the polar group-containing compound to a natural rubber main chain.

As the natural rubber raw material, various types of dried solid natural rubber, various natural rubber latex coagulations (including unsmoked sheets) or natural rubber cup lumps may be used. These natural rubber raw materials may be used alone or in combination of two or more thereof. It is not necessary to use a high purity natural rubber latex for producing the modified natural rubber of the present invention. Thus, the modified natural rubber may be produced at relatively low cost. In addition, among the above natural rubber raw materials, cup lumps are available at low price and thus is highly advantageous in terms of cost. In addition, when a cup lump is used as the raw material, there is still an advantage to doing so with all things considered in terms of cost and modification efficiency, although the modification efficiency of the natural rubber may drop slightly.

The modified natural rubber of the present invention is formed by graft polymerizing or attaching a polar group-containing compound to the natural rubber raw material.

As used herein, the term "polar group-containing compound" literally means a compound having any polar group, the type of which compound may be selected depending on the type of a modified rubber and the intended use appropriately.

When the polar group-containing compound is graft polymerized upon natural rubber molecules in the natural rubber raw material, the polar group-containing compound preferably has a carbon-carbon double bond in the molecule and is preferably a polar group-containing vinyl-based monomer. Alternatively, when the polar group-containing compound is reacted with the natural rubber molecules in the natural rubber raw material by attachment reaction, the polar group-containing compound preferably has a mercapto group in the molecule and is preferably a polar group-containing mercapto compound.

Preferably, a twin-screw kneader/extruder or a dry prebreaker is used as means for applying mechanical shear force to a mixture of the natural rubber raw material and the polar group-containing compound. In this case, when the polar group-containing compound is graft polymerized onto natural rubber molecules of the natural rubber raw material, a polymerization initiator is supplied to a device, which is capable of applying the mechanical shear force, along with the natural rubber raw material and the polar group-containing compound (preferably, a polar group-containing vinyl-based monomer) under mechanical shear force. This allows the polar group-containing compound to be introduced into the natural rubber molecules in the natural rubber raw material by graft polymerization. In addition, when the polar group-containing compound is reacted with the natural rubber molecules in the natural rubber raw material by attachment reaction, the natural rubber raw material and the polar group-containing compound (preferably, a polar group-containing mercapto compound), and further optionally an organic peroxide are supplied to a device capable of applying mechanical shear force under mechanical shear force. This enables the polar group-containing compound to be reacted by attachment reaction with the double bonds in the main chain of the natural rubber molecules of the natural rubber raw material.

Specific examples of the polar group of the polar group-containing vinyl-based monomer that is suitable for graft polymerization onto the natural rubber molecules in the natural rubber raw material may preferably include amino group, imino group, nitrile group, ammonium group, imido group, amido group, hydrazo group, azo group, diazo group, hydroxyl group, carboxyl group, carbonyl group, epoxy group, oxycarbonyl group, nitrogen-containing heterocyclic group, oxygen-containing heterocyclic group, tin-containing group, alkoxysilyl group, and so on. These polar group-containing vinyl-based monomers may be used alone or in combination of two or more thereof.

Vinyl-based monomers having the amino group include polymerizable monomers having in one molecule at least one amino group selected from primary, secondary and tertiary amino groups. Among these polymerizable monomers having the amino group, particularly preferred is a vinyl-based monomer having the tertiary amino group, such as dialkylaminoalkyl(meth)acrylate. These amino group-containing vinyl-based monomers may be used alone or in combination of two or more thereof.

Examples of the primary amino group-containing vinyl-based monomer include 4-vinylaniline, aminomethyl(meth)acrylate, aminoethyl(meth)acrylate, aminopropyl(meth)acrylate, aminobutyl(meth)acrylate, and so on.

In addition, examples of the secondary amino group-containing vinyl-based monomer include:

(1) anilinostyrenes, such as anilinostyrene, β-phenyl-p-anilinostyrene, β-cyano-p-anilinostyrene, β-cyano-β-methyl-p-anilinostyrene, β-chloro-p-anilinostyrene, β-carboxy-p-anilinostyrene, β-methoxycarbonyl-p-anilinostyrene, β-(2-hydroxyethoxy)carbonyl-p-anilinostyrene, β-formyl-p-anilinostyrene, β-formyl-β-methyl-p-anilino styrene, α-carboxy-β-carboxy-β-phenyl-p-anilinostyrene or the like;

(2) anilinophenylbutadienes, such as 1-anilinophenyl-1,3-butadiene, 1-anilinophenyl-3-methyl-1,3-butadiene, 1-anilinophenyl-3-chloro-1,3-butadiene, 3-anilinophenyl-2-methyl-1,3-butadiene, 1-anilinophenyl-2-chloro-1,3-butadiene, 2-anilinophenyl-1,3-butadiene, 2-anilinophenyl-3-methyl-1,3-butadiene, 2-anilinophenyl-3-chloro-1,3-butadiene or the like;

(3) N-monosubstituted (meth)acrylamides, such as N-methyl(meth)acrylamide, N-ethyl(meth)acrylamide, N-methylolacrylamide, N-(4-anilinophenyl)methacrylamide or the like; and so on.

Further, examples of the tertiary amino group-containing vinyl-based monomer include N,N-disubstituted aminoalkyl(meth)acrylate, N,N-disubstituted aminoalkyl(meth)acrylamide, and so on.

Examples of the N,N-disubstituted aminoalkyl(meth)acrylate include an ester of acrylic acid or methacrylic acid, such as N,N-dimethylaminomethyl(meth)acrylate, N,N-dimethylaminoethyl(meth)acrylate, N,N-dimethylaminopropyl(meth)acrylate, N,N-dimethylaminobutyl(meth)acrylate, N,N-diethylaminoethyl(meth)acrylate, N,N-diethylaminopropyl(meth)acrylate, N,N-diethylaminobutyl(meth)acrylate, N-methyl-N-ethylaminoethyl(meth)acrylate, N,N-dipropylaminoethyl(meth)acrylate, N,N-dibutylaminoethyl(meth)acrylate, N,N-dibutylaminopropyl(meth)acrylate, N,N-dibutylaminobutyl(meth)acrylate, N,N-dihexylaminoethyl(meth)acrylate, N,N-dioctylaminoethyl(meth)acrylate, acryloylmorpholine or the like, and so on. Among these, particularly preferred are N,N-dimethylaminoethyl(meth)acrylate, N,N-diethylaminoethyl(meth)acrylate, N,N-dipropylaminoethyl(meth)acrylate, N,N-dioctylaminoethyl(meth)acrylate, N-methyl-N-ethylaminoethyl(meth)acrylate, and so on.

In addition, examples of the N,N-disubstituted aminoalkyl(meth)acrylamide include acrylamide compounds or methacrylamide compounds, such as N,N-dimethylaminomethyl(meth)acrylamide, N,N-dimethylaminoethyl(meth)acrylamide, N,N-dimethylaminopropyl(meth)acrylamide, N,N-dimethylaminobutyl(meth)acrylamide, N,N-diethylaminoethyl(meth)acrylamide, N,N-diethylaminopropyl(meth)acrylamide, N,N-diethylaminobutyl(meth)acrylamide, N-methyl-N-ethylaminoethyl(meth)acrylamide, N,N-dipropylaminoethyl(meth)acrylamide, N,N-dibutylaminoethyl(meth)acrylamide, N,N-dibutylaminopropyl(meth)acrylamide, N,N-dibutylaminobutyl(meth)acrylamide, N,N-dihexylaminoethyl(meth)acrylamide, N,N-dihexylaminopropyl(meth)acrylamide, N,N-dioctylaminopropyl(meth)acrylamide or the like, and so on. Among these, particularly preferred are N,N-dimethylaminopropyl(meth)acrylamide, N,N-diethylaminopropyl(meth)acrylamide, N,N-dioctylaminopropyl(meth)acrylamide, and so on.

Vinyl-based monomers having the nitrile group include (meth)acrylonitrile, vinylidene cyanide, and so on. These vinyl-based monomers having the nitrile group may be used alone or in combination of two or more thereof.

Vinyl-based monomers having the hydroxyl group include polymerizable monomers having in one molecule at least one primary, secondary or tertiary hydroxyl group. Such monomers include hydroxyl group-containing unsaturated carboxylic acid-based monomers, hydroxyl group-containing vinyl ether-based monomers, hydroxyl group-containing vinyl ketone-based monomers, and so on. Specific examples of the hydroxyl group-containing vinyl-based monomers include: hydroxyalkyl(meth)acrylates, such as 2-hydroxyethyl(meth)acrylate, 2-hydroxypropyl(meth)acrylate, 3-hydroxypropyl(meth)acrylate, 2-hydroxybutyl(meth)acrylate, 3-hydroxybutyl(meth)acrylate, 4-hydroxybutyl(meth)acrylate or the like; mono(meth)acrylates of polyalkylene glycols (the number of alkylene glycol units being, for example, 2 to 23), such as polyethylene glycol or polypropylene glycol; hydroxyl group-containing unsaturated amides, such as N-hydroxymethyl(meth)acrylamide, N-(2-hydroxyethyl)(meth)acrylamide, N,N-bis(2-hydroxymethyl)(meth)acrylamide or the like; hydroxyl group-containing vinyl aromatic compounds, such as o-hydroxystyrene, m-hydroxystyrene, p-hydroxystyrene, o-hydroxy-α-methylstyrene, m-hydroxy-α-methylstyrene, p-hydroxy-α-methylstyrene, p-vinylbenzyl alcohol or the like; and so on. Among these, preferred are a hydroxyl group-containing unsaturated carboxylic acid-based monomer, hydroxyalkyl(meth)acrylates and hydroxyl group-containing vinyl aromatic compounds, and particularly preferred is a hydroxyl group-containing unsaturated carboxylic acid-based monomer. Examples of the hydroxyl group-containing unsaturated carboxylic acid-based monomer include derivatives, such as esters, amides or anhydrides, of acrylic acid, methacrylic acid, itaconic acid, fumaric acid, maleic acid or the like. Among these, particularly preferred are esters of acrylic acid, methacrylic acid, and so on. These hydroxyl group-containing vinyl-based monomers may be used alone or in combination of two or more thereof.

Vinyl-based monomers having the carboxyl group include unsaturated carboxylic acids, such as (meth)acrylic acid, maleic acid, fumaric acid, itaconic acid, tetraconic acid, cinnamic acid or the like; free carboxyl group-containing esters and salts thereof, such as a monoester of a non-polymerizable polyvalent carboxylic acid, such as phthalic acid, succinic acid, adipic acid or the like, and a hydroxyl group-containing unsaturated compound, such as (meth)allyl alcohol, 2-hydroxyethyl(meth)acrylate or the like; and so on. Among these, particularly preferred are unsaturated carboxylic acids. These carboxylic group-containing vinyl-based monomers may be used alone or in combination of two or more thereof.

Vinyl-based monomers having the epoxy group include (meth)allylglycidylether, glycidyl(meth)acrylate, 3,4-oxycyclohexyl(meth)acrylate, and so on. These epoxy group-containing vinyl-based monomers may be used alone or in combination of two or more thereof.

In the vinyl-based monomers having the nitrogen-containing heterocyclic group, examples of the nitrogen-containing heterocycle include pyrrol, histidine, imidazole, triazolidine, triazole, triazine, pyridine, pyrimidine, pyrazine, indole, quinoline, purine, phenazine, pteridine, melamine and so on. It should be noted that each of these nitrogen-containing heterocycles may include another heteroatom in the ring. Vinyl-based monomers having a pyridyl group as the nitrogen-containing heterocyclic group include 2-vinylpyridine, 3-vinylpyridine, 4-vinylpyridine, 5-methyl-2-vinylpyridine, 5-ethyl-2-vinylpyridine, and so on. Among these, particularly preferred are 2-vinylpyridine, 4-vinylpyridine, and so on. These nitrogen-containing heterocyclic group-containing vinyl-based monomers may be used alone or in combination of two or more thereof.

Vinyl-based monomers having the tin-containing group include tin-containing monomers, such as allyltri-n-butyltin, allyltrimethyltin, allyltriphenyltin, allyltri-n-octyltin, (meth)acryloxy-n-butyltin, (meth)acryloxytrimethyltin, (meth)acryloxytriphenyltin, (meth)acryloxy-n-octyltin, vinyltri-n-butyltin, vinyltrimethyltin, vinyltriphenyltin, vinyltri-n-octyltin or the like. These tin-containing vinyl-based monomers may be used alone or in combination of two or more thereof.

Vinyl-based monomers having the alkoxysilyl group include (meth)acryloxymethyltrimethoxysilane, (meth)acryloxymethylmethyldimethoxysilane, (meth)acryloxymethyldimethylmethoxysilane, (meth)acryloxymethyltriethoxysilane, (meth)acryloxymethylmethyldiethoxysilane, (meth)acryloxymethyldimethylethoxysilane, (meth)acryloxymethyltripropoxysilane, (meth)acryloxymethylmethyldipropoxysilane, (meth)acryloxymethyldimethylpropoxysilane, γ-(meth)acryloxypropyltrimethoxysilane, γ-(meth)acryloxypropylmethyldimethoxysilane, γ-(meth)acryloxypropyldimethylmethoxysilane, γ-(meth)acryloxypropyltriethoxysilane, γ-(meth)acryloxypropylmethyldiethoxysilane, γ-(meth)acryloxypropyldimethylethoxysilane, γ-(meth)acryloxypropyltripropoxysilane, γ-(meth)acryloxypropylmethyldipropoxysilane, γ-(meth)acryloxypropyldimethylpropoxysilane, γ-(meth)acryloxypropylmethyldiphenoxysilane, γ-(meth)acryloxypropyldimethylphenoxysilane, γ-(meth)acryloxypropylmethyldibenzyloxysilane, γ-(meth)acryloxypropyldimethylbenzyloxysilane, trimethoxyvinylsilane, triethoxyvinylsilane, 6-trimethoxysilyl-1,2-hexene, p-trimethoxysilylstyrene, and so on. These alkoxysilyl group-containing vinyl-based monomers may be used alone or in combination of two or more thereof.

The polymerization initiator used for graft polymerizing the polar group-containing compound upon natural rubber molecules in the natural rubber raw material is not limited to a particular one, and so any polymerization initiators for emulsion polymerization may be used and there is no particular limitation on the addition method thereof. Examples of commonly-used polymerization initiators include benzoyl peroxide, hydrogen peroxide, cumene hydroperoxide, tert-butyl hydroperoxide, di-tert-butyl peroxide, 2,2-azobisisobutyronitrile, 2,2-azobis(2-diaminopropane)hydrochloride, 2,2-azobis(2-diaminopropane)dihydrochloride, 2,2-azobis(2,4-dimethylvaleronitrile), potassium persulfate, sodium persulfate, ammonium persulfate, and so on. It is preferable to use a redox-type polymerization initiator for lowering the polymerization temperature. In such a redox-type polymerization initiator, examples of the reducing agent to be combined with a peroxide include tetraethylenepentamine, mercaptans, sodium hydrogen sulfite, reducible metal ions, ascorbic acid, and so on. Preferred combinations of peroxide and reducing agent in the redox-type polymerization initiator include a combination of tert-butyl hydroperoxide with tetraethylenepentamine, and so on.

In addition, in terms of suppression of gelation of a graft-polymerized modified natural rubber, as the polymerization initiator, it is preferable to use such a polymerization initiator that is not a conjugated system and that has a structure containing 5 to 10 carbon atoms in an alkyl chain extending from an atom radical-cleaving at one point to provide at least one radical. This because a conjugated system will not provide a sufficient gelation suppressing effect, and in the case of a structure radical cleaving at two points, gelation can be even promoted due to the cross-linking of the natural rubber. As used herein, the atom that becomes the radical means an atom with a covalent bond broken at a point where cleavage occurred, and the alkyl chain extending from the atom means an alkyl chain that extends from that atom prior to radical cleavage. The reason why the number of carbon atoms in the alkyl chain is limited to 5 to 10 is because a sufficient gelation suppressing effect cannot be achieved if the number of carbon atoms is less than 5, while the alkyl chain gets longer and the cleavage temperature goes low if the number of carbon atoms is more than 10, which makes it difficult to use the resulting polymerization initiator.

Examples of the above-mentioned polymerization initiator include the following structures:

[Chemical Formula 1]

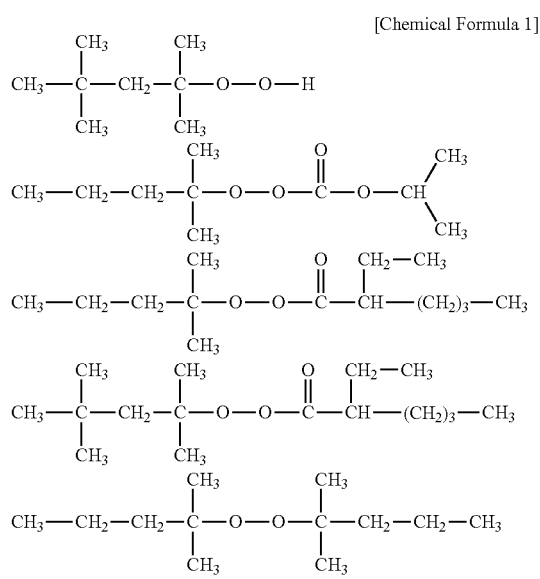

The reason why the polymerization initiator is optimized to suppress gelation in the modified natural rubber of the present invention is because workability deteriorates if gelation progresses beyond a certain level.

To improve the low loss factor and wear resistance without impairing the workability of the rubber composition by blending the modified natural rubber with a filler, such as carbon black or silica, it is important that the polar group-containing compound is introduced in small amounts and evenly to each natural rubber molecule. Therefore, the attaching amount of the polymerization initiator is preferably 1 to 100 mol % and more preferably 10 to 100 mol % in relation to the polar group-containing compound.

Each of the above-mentioned components may be loaded into a device in which mechanical shear force can be applied to each component, whereby a modified natural rubber with a polar group-containing compound graft copolymerized upon natural rubber molecules may be obtained. In this case, modification reaction of the natural rubber molecules may be conducted under warming, preferably at temperatures of 30° C. to 160° C., more preferably 50° C. to 130° C., thereby providing the modified natural rubber with sufficient reaction efficiency.

On the other hand, specific examples of polar groups of the polar group-containing mercapto compounds that are suitably reacted with the natural rubber molecules of the natural rubber raw material by attachment reaction may preferably include amino group, imino group, nitrile group, ammonium group, imido group, amido group, hydrazo group, azo group, diazo group, hydroxyl group, carboxyl group, carbonyl group, epoxy group, oxycarbonyl group, nitrogen-containing heterocyclic group, oxygen-containing heterocyclic group, tin-containing group, alkoxysilyl group, and so on. The mercapto compounds having these polar groups may be used alone or in combination of two or more thereof.

Mercapto compounds having the amino group include mercapto compounds containing in one molecule at least one amino group selected from primary, secondary and tertiary amino groups. Among these amino group-containing mercapto compounds, particularly preferred is the tertiary amino group-containing mercapto compound. In this case, primary amino group-containing mercapto compounds include 4-mercaptoaniline, 2-mercaptoethylamine, 2-mercaptopropylamine, 3-mercaptopropylamine, 2-mercaptobutylamine, 3-mercaptobutylamine, 4-mercaptobutylamine, and so on. In addition, secondary amino group-containing mercapto compounds include N-methylaminoethanethiol, N-ethylaminoethanethiol, N-methylaminopropanethiol, N-ethylaminopropanethiol, N-methylaminobutanethiol, N-ethylaminobutanethiol, and so on. Further, tertiary amino group-containing mercapto compounds include N,N-disubstituted aminoalkylmercaptan, such as N,N-dimethylaminoethanethiol, N,N-diethylaminoethanethiol, N,N-dimethylaminopropanethiol, N,N-diethylaminopropanethiol, N,N-dimethylaminobutanethiol, N,N-diethylaminobutanethiol, and so on. Among these amino group-containing mercapto compounds, 2-mercaptoethylamine and N,N-dimethylaminoethanethiol are preferable. These amino group-containing mercapto compounds may be used alone or in combination of two or more thereof.

Mercapto compounds having the nitrile group include 2-mercaptopropanenitrile, 3-mercaptopropanenitrile, 2-mercaptobutanenitrile, 3-mercaptobutanenitrile, 4-mercaptobutanenitrile, and so on. These nitrile group-containing mercapto compounds may be used alone or in combination of two or more thereof.

Mercapto compounds having the hydroxyl group include mercapto compounds containing in one molecule at least one primary, secondary or tertiary hydroxyl group. Specific examples of the hydroxyl group-containing mercapto compounds include 2-mercaptoethanol, 3-mercapto-1-propanol, 3-mercapto-2-propanol, 4-mercapto-1-butanol, 4-mercapto-2-butanol, 3-mercapto-1-butanol, 3-mercapto-2-butanol, 3-mercapto-1-hexanol, 3-mercapto-1,2-propanediol, 2-mercaptobenzyl alcohol, 2-mercaptophenol, 4-mercaptophenol, and so on; among these preferred is 2-mercaptoethanol. These hydroxyl group-containing mercapto compounds may be used alone or in combination of two or more thereof.

Mercapto compounds having the carboxyl group include mercaptoacetic acid, mercaptopropionic acid, thiosalicylic acid, mercaptomalonic acid, mercaptosuccinic acid, mercaptobenzoic acid, and so on; among these preferred is mercaptoacetic acid. These carboxyl group-containing mercapto compounds may be used alone or in combination of two or more thereof.

In the mercapto compounds having the nitrogen-containing heterocyclic group, examples of the nitrogen-containing heterocycle include pyrrol, histidine, imidazole, triazolidine, triazole, triazine, pyridine, pyrimidine, pyrazine, indole, quinoline, purine, phenazine, pteridine, melamine, and so on. It should be noted that each of these nitrogen-containing heterocycles may include another heteroatom in the ring. Mercapto compounds having a pyridyl group as the nitrogen-containing heterocyclic group include 2-mercaptopyridine, 3-mercaptopyridine, 4-mercaptopyridine, 5-methyl-2-mercaptopyridine, 5-ethyl-2-mercaptopyridine, and so on. In addition, mercapto compounds having other nitrogen-containing heterocyclic groups include 2-mercaptopyrimidine, 2-mercapto-5-methylbenzimidazole, 2-mercapto-1-methylimidazole, 2-mercaptobenzimidazole, 2-mercaptoimidazole, and so on; among these preferred are 2-mercaptopyridine, 4-mercaptopyridine, and so on. These mercapto compounds having the nitrogen-containing heterocyclic groups may be used alone or in combination of two or more thereof.

Mercapto compounds having the tin-containing group include tin-containing mercapto compounds, such as 2-mercaptoethyltri-n-butyltin, 2-mercaptoethyltrimethyltin, 2-mercaptoethyltriphenyltin, 3-mercaptopropyltri-n-butyltin, 3-mercaptopropyltrimethyltin, 3-mercaptopropyltriphenyltin or the like. These tin-containing mercapto compounds may be used alone or in combination of two or more thereof.

Mercapto compounds containing the alkoxysilyl group include 3-mercaptopropyltrimethoxysilane, 3-mercaptopropyltriethoxysilane, 3-mercaptopropylmethyldimethoxysilane, 3-mercaptopropyldimethylmethoxysilane, 2-mercaptoethyltrimethoxysilane, 2-mercaptoethyltriethoxysilane, mercaptomethylmethyldiethoxysilane, mercaptomethyltrimethoxysilane, and so on; among these preferred is 3-mercaptopropyltrimethoxysilane. These alkoxysilyl group-containing mercapto compounds may be used alone or in combination of two or more thereof.

Each of the above-mentioned components may be loaded into a device in which mechanical shear force can be applied to each component, whereby a modified natural rubber with a polar group-containing compound reacted with natural rubber molecules by attachment reaction may be obtained. In this case, modification reaction of the natural rubber molecules may be conduced under warming, preferably at temperatures of 30° C. to 160° C., more preferably 50° C. to 130° C., thereby providing the modified natural rubber with sufficient attachment efficiency.

In the modified natural rubber of the present invention, a grafting or attaching amount of the polar group-containing compound is preferably 0.01 to 5.0 parts by mass, more preferably 0.05 to 2.0 parts by mass, and still more preferably 0.10 to 1.0 parts by mass, per 100 parts by mass of the solid rubber component in the natural rubber raw material. This is because if the grafting or attaching amount of the polar group-containing compound is less than 0.01 parts by mass, the low loss factor and wear resistance of the rubber composition may not be improved sufficiently. In addition, if the grafting or attaching amount of the polar group-containing compound is 5.0 parts by mass, the original physical properties of the natural rubber, such as viscoelasticity or S—S characteristics (a stress-strain curve in a tensile tester), are greatly changed, resulting in a degradation in the excellent physical properties originally possessed by the natural rubber and a significant reduction in the workability of the rubber composition.

An aspect of the present invention provides a rubber composition using the modified natural rubber, which preferably further contains a filler. In this case, while there is no particular limitation on the amount of the filler to be blended, the filler is preferably blended in an amount of 5 to 100 parts by mass, more preferably 10 to 70 parts by mass, per 100 parts by mass of the modified natural rubber. This is because the filler may not provide a sufficient reinforcing performance if blended in an amount of less than 5 parts by mass, while it may deteriorate the workability if blended in an amount of more than 100 parts by mass.

Fillers for use in the rubber composition of the present invention include carbon black and inorganic fillers. In this case, the inorganic fillers include silica and inorganic compounds represented by the following formula (I):

$$nM.xSiO_y.zH_2O \qquad (I)$$

[where M is a metal selected from the group consisting of aluminum, magnesium, titanium, calcium and zirconium, oxides or hydroxides thereof and hydrates thereof, or at least one selected from carbonates of these metals; and n, x, y and z are integers between 1 and 5, between 0 and 10, between 2 and 5 and between 0 and 10, respectively].

These fillers may be used alone or in combination of two or more thereof.

Examples of the carbon black include GPF-, FEF-, SRF-, HAF-, ISAF- and SAF-grade carbon black, and examples of the silica include wet silica, dry silica, colloidal silica, and so on. Further, the inorganic compounds of the formula (I) above include alumina ($Al_2O_3$) such as γ-alumina or α-alumina; alumina monohydrate ($Al_2O_3.H_2O$) such as boehmite or diaspore; aluminum hydroxide [$Al(OH)_3$] such as gibbsite or bayerite; aluminum carbonate [$Al_2(CO_3)_3$]; magnesium hydroxide [$Mg(OH)_2$]; magnesium oxide (MgO); magnesium carbonate ($MgCO_3$); talc ($3MgO.4SiO_2.H_2O$); attapulgite ($5MgO.8SiO_2.9H_2O$); titanium white ($TiO_2$); titanium black ($TiO_{2n-1}$); calcium oxide (CaO); calcium hydroxide [$Ca(OH)_2$]; magnesium aluminum oxide ($MgO.Al_2O_3$); clay ($Al_2O_3.2SiO_2$); kaolin ($Al_2O_3/2SiO_2/2H_2O$); pyrophyllite ($Al_2O_3.4SiO_2.H_2O$); bentonite ($Al_2O_3.4SiO_2.2H_2O$); aluminum silicate (such as $Al_2SiO_5$ or $Al_4.3SiO_4.5H_2O$); magnesium silicate (such as $Mg_2SiO_4$ or $MgSiO_3$); calcium silicate ($Ca_2SiO_4$); calcium aluminum silicate (such as $Al_2O_3.CaO.2SiO_2$); calcium magnesium silicate ($CaMgSiO_4$); calcium carbonate ($CaCO_3$); zirconium oxide ($ZrO_2$); zirconium hydroxide [$ZrO(OH)_2.nH_2O$]; zirconium carbonate [$Zr(CO_3)_2$]; charge compensating hydrogen like zeolites; crystalline aluminosilicate including alkali metal or alkaline-earth metal; and so on.

The rubber composition of the present invention may be blended with, in addition to the modified natural rubber and filler, any compounding agents that are usually used in the rubber industry, for example, antioxidant, softener, silane coupling agent, stearic acid, zinc flower, vulcanizing accelerator, vulcanizing agent, and so on, which may be selected appropriately without departing from the objects of the present invention. Preferably, commercially available compounding agents may be used as these compounding agents. The rubber composition of the present invention may be produced by, for example, kneading, warming and extruding the modified natural rubber, which is optionally blended with the selected compounding agents appropriately.

(Tire)

An aspect of the present invention provides a tire using the above-described rubber composition, where the rubber composition is preferably used in the tread. The tire using the rubber composition in the tread is excellent in low fuel consumption characteristics, fracture resistance and wear resistance. In addition, the tire of the present invention has no particular limitation except for the use of the above-mentioned rubber composition in any of the tire members, and so may be manufactured according to conventional methods. In addition, examples of the gas filled in the tire may include normal air or air with coordinated oxygen tension as well as inert gas, such as nitrogen, argon or helium.

EXAMPLES

The present invention will now be described in detail below with reference to examples thereof. However, the present invention is not limited to the disclosed examples in any way.

Production Example 1

Firstly, 600 g of RSS (Ribbed Smoked Sheets) in terms of dry rubber content, 1.8 g of N,N-diethylaminoethylmethacrylate and 0.7 g of tert-butylhydroperoxide (t-BHPO) were kneaded and uniformly dispersed in a kneader at room temperature for 2 minutes at 30 rpm. Then, while uniformly adding 0.7 g of tetraethylenepentamine (TEPA), the resulting mixture was extruded under mechanical shear force with a barrel temperature of 120° C. and a rotational speed of 100 rpm, using a twin-screw kneader/extruder manufactured by Kobe Steel, Ltd. [co-rotation screw diameter: 30 mm, L/D: 35, the number of vent holes: 3], whereby a modified natural rubber A-a (Table 1-1) was obtained.

In addition, the grafting amount of N,N-diethylaminoethylmethacrylate in the resulting modified natural rubber A-a was analyzed by using a pyrolysis-gas chromatograph-mass spectrometer after extraction of unreacted monomers, and determined to be 0.01 parts by mass per 100 parts by mass of the solid rubber component in the natural rubber raw material.

Production Examples 2 to 7

Added in place of 1.8 g of N,N-diethylaminoethylmethacrylate were 1.2 g of 2-hydroxyethylmethacrylate in Production Example 2, 0.9 g of 4-vinylpyridine in Production Example 3, 0.8 g of methacrylic acid in Production Example 4, 0.9 g of acrylonitrile in Production Example 5, 1.3 g of glycidylmethacrylate in Production Example 6, and 1.5 g of methacrylamide in Production Example 7, with the conditions being otherwise the same as Production Example 1, thereby obtaining modified natural rubbers A-b to A-g, respectively. In addition, the grafting amount of the polar group-containing compounds added as monomers in the modified natural rubbers A-b to A-g was analyzed in the same manner as in the modified natural rubber A-a. The obtained results are shown in Table 1-1.

Production Example 8

A modified natural rubber A-h was obtained (Table 1-1) in the same manner as in Production Example 1, except for the use of 0.9 g of N,N-dimethylaminoethanethiol in place of 1.8 g of N,N-diethylaminoethylmethacrylate without adding tert-butylhydroperoxide (t-BHPO) and tetraethylenepentamine (TEPA). In addition, the attaching amount of dimethylaminomethanethiol in the resulting modified natural rubber A-h was analyzed by using a pyrolysis-gas chromatograph-mass spectrometer, and determined to be 0 parts by mass per 100 parts by mass of the solid rubber component in the natural rubber raw material.

Production Examples 9 to 12

Added in place of 0.9 g of N,N-dimethylaminoethanethiol were 1.0 g of 4-mercaptopyridine in Production Example 9, 0.6 g of mercaptoethanol in Production Example 10, 0.7 g of mercaptoacetic acid in Production Example 11, and 1.7 g of 3-mercaptopropyltrimethoxysilane in Production Example 12, with the conditions being otherwise the same as in Production Example 8, thereby obtaining modified natural rubbers A-i to A-l (Table 1-1), respectively. In addition, the attaching amount of the mercapto compounds in the modified natural rubbers A-i to A-l was analyzed in the same manner as in the modified natural rubber A-h. The obtained results are shown in Table 1-1.

Production Example 13

The above-mentioned RSS was kneaded and uniformly dispersed in a kneader at room temperature for two minutes at 30 rpm. Then, the resulting mixture was extruded under mechanical shear force with a barrel temperature of 120° C. and a rotational speed of 100 rpm, using a twin-screw kneader/extruder manufactured by Kobe Steel, Ltd. [co-rotation screw diameter: 30 mm, L/D: 35, the number of vent holes: 3], whereby a modified natural rubber A-m (Table 1-1) was obtained.

Production Examples 14 to 26

Modified natural rubbers B-a to B-l and a natural rubber B-m were obtained (Table 1-1) in the same manner as in Production Examples 1 to 13, except for the use of a natural rubber shown below, in place of RSS of Production Examples 1 to 13, as the natural rubber raw material.

The natural rubber as the natural rubber raw material was obtained in the following way. A natural rubber latex (CT-1) added with 0.4 mass % of ammonia was concentrated by being centrifuged for 15 minutes with a rotational speed of 7500 rpm using a latex separator SLP-3000 (manufactured by Saito Centrifuge Industry). The concentrated latex was further centrifuged for 15 minutes with a rotational speed of 7500 rpm. The resulting concentrated latex was diluted to a solid content of about 20%, then added with formic acid and left overnight. Subsequently, the rubber content obtained from coagulation was dried at 110° C. for 210 minutes to obtain a natural rubber. In addition, the grafting or attaching amount of the polar group-containing compounds in the modified natural rubbers B-a to B-l was analyzed in the same manner as in the modified natural rubber A-a or A-h. The obtained results are shown in Table 1-1.

Production Examples 27 to 39

Modified natural rubbers C-a to C-l and a natural rubber C-m were obtained (Table 1-1) in the same manner as in Production Examples 1 to 13, except for the use of a natural rubber shown below, in place of RSS of Production Examples 1 to 13, as the natural rubber raw material.

A natural rubber as the natural rubber raw material was obtained in the following way. A solution was prepared by adding and mixing 24.7 ml of an anionic surfactant ("DEMOL" manufactured by Kao Corporation, surfactant concentration: 2.5 mass %) and 0.06 g of Protease ("Alcalase 2.5 L, Type DX" manufactured by Novozymes Japan Ltd.) to 136 g of water. Then, 1000 g of a natural rubber latex with a solid content of 20 mass % was placed in a water bath at a constant temperature of 40° C. Then, the solution was added dropwise to the water bath under stirring, and the stirring was continued at the same temperature for five hours to obtain a natural rubber latex. The rubber content, which was obtained by acid coagulation of the above-described natural rubber latex, was passed five times through a drum dryer set at 130° C. and then dried in a vacuum dryer at 40° C. for 8 hours to obtain a natural rubber. In addition, the grafting or attaching amount of the polar group-containing compounds in the modified natural rubbers C-a to C-l was analyzed in the same manner as in the modified natural rubber A-a or A-h. The obtained results are shown in Table 1-1.

Production Examples 40 to 52

Modified natural rubbers D-a to D-l and a natural rubber D-m were obtained (Table 1-2) in the same manner as in Production Examples 1 to 13, except that USS (Un Smoked Sheet), in place of RSS of Production Examples 1 to 13, was used as the natural rubber raw material and dried after modification. In addition, the grafting or attaching amount of the polar group-containing compounds in the modified natural rubbers D-a to D-1 was analyzed in the same manner as in the modified natural rubber A-a or A-h. The obtained results are shown in Table 1-2.

Production Examples 53 to 65

Modified natural rubbers E-a to E-1 and a natural rubber E-m were obtained (Table 1-2) in the same manner as in Production Examples 1 to 13, except that a natural rubber shown below, in place of RSS of Production Examples 1 to 13, was used as the natural rubber raw material and dried after modification. The natural rubber as the natural rubber raw material was obtained in the following way. A natural rubber latex (CT-1) added with 0.4 mass % of ammonia was concentrated by being centrifuged for 15 minutes with a rotational speed of 7500 rpm using a latex separator SLP-3000 (manufactured by Saito Centrifuge Industry). The concentrated latex was further centrifuged for 15 minutes with a rotational speed of 7500 rpm. The resulting concentrated latex was diluted to a solid content of about 20%, then added with formic acid and left overnight to obtain a rubber content. In addition, the grafting or attaching amount of the polar group-containing compounds in the modified natural rubbers E-a to E-1 was analyzed in the same manner as in the modified natural rubber A-a or A-h. The obtained results are shown in Table 1-2.

Production Examples 66 to 78

Modified natural rubbers F-a to F-1 and a natural rubber F-m were obtained (Table 1-2) in the same manner as in Production Examples 1 to 13, except that a natural rubber shown below, in place of RSS of Production Examples 1 to 13, was used as the natural rubber raw material and dried after modification. A natural rubber as the natural rubber raw material was obtained in the following way. A solution was prepared by adding and mixing 24.7 ml of an anionic surfactant ("DEMOL" manufactured by Kao Corporation, surfactant concentration: 2.5 mass %) and 0.06 g of Protease ("Alcalase 2.5 L, Type DX" manufactured by Novozymes Japan Ltd.) to 136 g of water. Then, 1000 g of a natural rubber latex with a solid content of 20 mass % was placed in a water bath at a constant temperature of 40° C. Then, the solution was added dropwise to the water bath under stirring, and the stirring was continued at the same temperature for five hours to obtain a natural rubber latex. A rubber content was obtained by acid coagulation of the above-described natural rubber latex. In addition, the grafting or attaching amount of the polar group-containing compounds in the modified natural rubbers F-a to F-1 was analyzed in the same manner as in the modified natural rubber A-a or A-h. The obtained results are shown in Table 1-2.

TABLE 1-1

| | | Natural Rubber Raw Material | | Polar Group-containing Compound | | | | | |
|---|---|---|---|---|---|---|---|---|---|
| No. | Product | Type | Nitrogen Content | Type | Additive Amount | Grafting Amount | Attaching Amount | t-BHPO | TEPA |
| Production Example 1 | Modified Natural Rubber A-a | RSS | 0.48 | N,N-diethylaminoethylmethacrylate | 1.8 | 0.01 | — | 0.7 | 0.7 |
| Production Example 2 | Modified Natural Rubber A-b | RSS | 0.48 | 2-hydroxyethylmethacrylate | 1.2 | 0 | — | 0.7 | 0.7 |
| Production Example 3 | Modified Natural Rubber A-c | RSS | 0.48 | 4-vinylpyridine | 0.9 | 0 | — | 0.7 | 0.7 |
| Production Example 4 | Modified Natural Rubber A-d | RSS | 0.48 | Methacrylic Acid | 0.8 | 0 | — | 0.7 | 0.7 |
| Production Example 5 | Modified Natural Rubber A-e | RSS | 0.55 | Acrylonitrile | 0.9 | 0 | — | 0.7 | 0.7 |
| Production Example 6 | Modified Natural Rubber A-f | RSS | 0.55 | Glycidylmethacrylate | 1.3 | 0 | — | 0.7 | 0.7 |
| Production Example 7 | Modified Natural Rubber A-g | RSS | 0.55 | Methacrylamide | 1.5 | 0.02 | — | 0.7 | 0.7 |
| Production Example 8 | Modified Natural Rubber A-h | RSS | 0.48 | N,N-dimethylaminoethanethiol | 0.9 | — | 0 | 0.7 | 0.7 |
| Production Example 9 | Modified Natural Rubber A-i | RSS | 0.48 | 4-mercaptopyridine | 1 | — | 0 | 0.7 | 0.7 |
| Production Example 10 | Modified Natural Rubber A-j | RSS | 0.55 | Mercaptoethanol | 0.6 | — | 0 | 0.7 | 0.7 |
| Production Example 11 | Modified Natural Rubber A-k | RSS | 0.55 | Mercaptoacetic Acid | 0.7 | — | 0 | 0.7 | 0.7 |
| Production Example 12 | Modified Natural Rubber A-l | RSS | 0.55 | 3-mercaptopropyltrimethoxysilane | 1.7 | — | 0.02 | 0.7 | 0.7 |
| Production Example 13 | Natural Rubber A-m | RSS | 0.48 | Natural Rubber | — | — | — | — | — |
| Production Example 14 | Modified Natural Rubber B-a | Low Nitrogen 1 | 0.38 | N,N-diethylaminoethylmethacrylate | 1.8 | 0.2 | — | 0.7 | 0.7 |
| Production Example 15 | Modified Natural Rubber B-b | Low Nitrogen 1 | 0.38 | 2-hydroxyethylmethacrylate | 1.2 | 0.2 | — | 0.7 | 0.7 |
| Production Example 16 | Modified Natural Rubber B-c | Low Nitrogen 1 | 0.38 | 4-vinylpyridine | 0.9 | 0.17 | — | 0.7 | 0.7 |
| Production Example 17 | Modified Natural Rubber B-d | Low Nitrogen 1 | 0.38 | Methacrylic Acid | 0.8 | 0.14 | — | 0.7 | 0.7 |
| Production Example 18 | Modified Natural Rubber B-e | Low Nitrogen 1 | 0.2 | Acrylonitrile | 0.9 | 0.21 | — | 0.7 | 0.7 |

TABLE 1-1-continued

| No. | Product | Natural Rubber Raw Material Type | Nitrogen Content | Polar Group-containing Compound Type | Additive Amount | Grafting Amount | Attaching Amount | t-BHPO | TEPA |
|---|---|---|---|---|---|---|---|---|---|
| Production Example 19 | Modified Natural Rubber B-f | Low Nitrogen 1 | 0.2 | Glycidylmethacrylate | 1.3 | 0.23 | — | 0.7 | 0.7 |
| Production Example 20 | Modified Natural Rubber B-g | Low Nitrogen 1 | 0.2 | Methacrylamide | 1.5 | 0.27 | — | 0.7 | 0.7 |
| Production Example 21 | Modified Natural Rubber B-h | Low Nitrogen 1 | 0.31 | N,N-dimethylaminoethanethiol | 0.9 | — | 0.2 | 0.7 | 0.7 |
| Production Example 22 | Modified Natural Rubber B-i | Low Nitrogen 1 | 0.31 | 4-mercaptopyridine | 1 | — | 0.21 | 0.7 | 0.7 |
| Production Example 23 | Modified Natural Rubber B-j | Low Nitrogen 1 | 0.38 | Mercaptoethanol | 0.6 | — | 0.13 | 0.7 | 0.7 |
| Production Example 24 | Modified Natural Rubber B-k | Low Nitrogen 1 | 0.38 | Mercaptoacetic Acid | 0.7 | — | 0.14 | 0.7 | 0.7 |
| Production Example 25 | Modified Natural Rubber B-l | Low Nitrogen 1 | 0.38 | 3-mercaptopropyltrimethoxysilane | 1.7 | — | 0.22 | 0.7 | 0.7 |
| Production Example 26 | Natural Rubber B-m | Low Nitrogen 1 | 0.2 | Natural Rubber | — | — | — | — | — |
| Production Example 27 | Modified Natural Rubber C-a | Low Nitrogen 2 | 0.12 | N,N-diethylaminoethylmethacrylate | 1.8 | 0.3 | — | 0.7 | 0.7 |
| Production Example 28 | Modified Natural Rubber C-b | Low Nitrogen 2 | 0.12 | 2-hydroxyethylmethacrylate | 1.2 | 0.28 | — | 0.7 | 0.7 |
| Production Example 29 | Modified Natural Rubber C-c | Low Nitrogen 2 | 0.12 | 4-vinylpyridine | 0.9 | 0.27 | — | 0.7 | 0.7 |
| Production Example 30 | Modified Natural Rubber C-d | Low Nitrogen 2 | 0.12 | Methacrylic Acid | 0.8 | 0.22 | — | 0.7 | 0.7 |
| Production Example 31 | Modified Natural Rubber C-e | Low Nitrogen 2 | 0.12 | Acrylonitrile | 0.9 | 0.24 | — | 0.7 | 0.7 |
| Production Example 32 | Modified Natural Rubber C-f | Low Nitrogen 2 | 0.12 | Glycidylmethacrylate | 1.3 | 0.26 | — | 0.7 | 0.7 |
| Production Example 33 | Modified Natural Rubber C-g | Low Nitrogen 2 | 0.12 | Methacrylamide | 1.5 | 0.31 | — | 0.7 | 0.7 |
| Production Example 34 | Modified Natural Rubber C-h | Low Nitrogen 2 | 0.12 | N,N-dimethylaminoethanethiol | 0.9 | — | 0.25 | 0.7 | 0.7 |
| Production Example 35 | Modified Natural Rubber C-i | Low Nitrogen 2 | 0.12 | 4-mercaptopyridine | 1 | — | 0.27 | 0.7 | 0.7 |
| Production Example 36 | Modified Natural Rubber C-j | Low Nitrogen 2 | 0.12 | Mercaptoethanol | 0.6 | — | 0.18 | 0.7 | 0.7 |
| Production Example 37 | Modified Natural Rubber C-k | Low Nitrogen 2 | 0.12 | Mercaptoacetic Acid | 0.7 | — | 0.2 | 0.7 | 0.7 |
| Production Example 38 | Modified Natural Rubber C-l | Low Nitrogen 2 | 0.12 | 3-mercaptopropyltrimethoxysilane | 1.7 | — | 0.32 | 0.7 | 0.7 |
| Production Example 39 | Natural Rubber C-m | Low Nitrogen 2 | 0.12 | Natural Rubber | — | — | — | — | — |

TABLE 1-2

| No. | Product | Natural Rubber Raw Material Type | Nitrogen Content | Polar Group-containing Compound Type | Additive Amount | Grafting Amount | Attaching Amount | t-BHPO | TEPA |
|---|---|---|---|---|---|---|---|---|---|
| Production Example 40 | Modified Natural Rubber D-a | USS | 0.55 | N,N-diethylaminoethylmethacrylate | 1.8 | 0.01 | — | 0.7 | 0.7 |
| Production Example 41 | Modified Natural Rubber D-b | USS | 0.55 | 2-hydroxyethylmethacrylate | 1.2 | 0 | — | 0.7 | 0.7 |
| Production Example 42 | Modified Natural Rubber D-c | USS | 0.55 | 4-vinylpyridine | 0.9 | 0 | — | 0.7 | 0.7 |
| Production Example 43 | Modified Natural Rubber D-d | USS | 0.55 | Methacrylic Acid | 0.8 | 0 | — | 0.7 | 0.7 |
| Production Example 44 | Modified Natural Rubber D-e | USS | 0.48 | Acrylonitrile | 0.9 | 0 | — | 0.7 | 0.7 |
| Production Example 45 | Modified Natural Rubber D-f | USS | 0.48 | Glycidylmethacrylate | 1.3 | 0 | — | 0.7 | 0.7 |
| Production Example 46 | Modified Natural Rubber D-g | USS | 0.48 | Methacrylamide | 1.5 | 0.03 | — | 0.7 | 0.7 |
| Production Example 47 | Modified Natural Rubber D-h | USS | 0.55 | N,N-dimethylaminoethanethiol | 0.9 | — | 0 | 0.7 | 0.7 |

TABLE 1-2-continued

| | | Natural Rubber Raw Material | | Polar Group-containing Compound | | | | | |
|---|---|---|---|---|---|---|---|---|---|
| No. | Product | Type | Nitrogen Content | Type | Additive Amount | Grafting Amount | Attaching Amount | t-BHPO | TEPA |
| Production Example 48 | Modified Natural Rubber D-i | USS | 0.55 | 4-mercaptopyridine | 1 | — | 0 | 0.7 | 0.7 |
| Production Example 49 | Modified Natural Rubber D-j | USS | 0.48 | Mercaptoethanol | 0.6 | — | 0 | 0.7 | 0.7 |
| Production Example 50 | Modified Natural Rubber D-k | USS | 0.48 | Mercaptoacetic Acid | 0.7 | — | 0 | 0.7 | 0.7 |
| Production Example 51 | Modified Natural Rubber D-l | USS | 0.48 | 3-mercaptopropyltrimethoxysilane | 1.7 | — | 0.01 | 0.7 | 0.7 |
| Production Example 52 | Natural Rubber D-m | USS | 0.55 | NR | — | — | — | — | — |
| Production Example 53 | Modified Natural Rubber E-a | Low-Nitrogen Raw Material 1 | 0.2 | N,N-diethylaminoethylmethacrylate | 1.8 | 0.22 | — | 0.7 | 0.7 |
| Production Example 54 | Modified Natural Rubber E-b | Low-Nitrogen Raw Material 2 | 0.2 | 2-hydroxyethylmethacrylate | 1.2 | 0.19 | — | 0.7 | 0.7 |
| Production Example 55 | Modified Natural Rubber E-c | Low-Nitrogen Raw Material 3 | 0.2 | 4-vinylpyridine | 0.9 | 0.2 | — | 0.7 | 0.7 |
| Production Example 56 | Modified Natural Rubber E-d | Low-Nitrogen Raw Material 4 | 0.2 | Methacrylic Acid | 0.8 | 0.15 | — | 0.7 | 0.7 |
| Production Example 57 | Modified Natural Rubber E-e | Low-Nitrogen Raw Material 5 | 0.38 | Acrylonitrile | 0.9 | 0.23 | — | 0.7 | 0.7 |
| Production Example 58 | Modified Natural Rubber E-f | Low-Nitrogen Raw Material 6 | 0.38 | Glycidylmethacrylate | 1.3 | 0.21 | — | 0.7 | 0.7 |
| Production Example 59 | Modified Natural Rubber E-g | Low-Nitrogen Raw Material 7 | 0.38 | Methacrylamide | 1.5 | 0.25 | — | 0.7 | 0.7 |
| Production Example 60 | Modified Natural Rubber E-h | Low-Nitrogen Raw Material 8 | 0.31 | N,N-dimethylaminoethanethiol | 0.9 | — | 0.18 | 0.7 | 0.7 |
| Production Example 61 | Modified Natural Rubber E-i | Low-Nitrogen Raw Material 9 | 0.31 | 4-mercaptopyridine | 1 | — | 0.21 | 0.7 | 0.7 |
| Production Example 62 | Modified Natural Rubber E-j | Low-Nitrogen Raw Material 10 | 0.38 | Mercaptoethanol | 0.6 | — | 0.14 | 0.7 | 0.7 |
| Production Example 63 | Modified Natural Rubber E-k | Low-Nitrogen Raw Material 11 | 0.38 | Mercaptoacetic Acid | 0.7 | — | 0.16 | 0.7 | 0.7 |
| Production Example 64 | Modified Natural Rubber E-l | Low-Nitrogen Raw Material 12 | 0.38 | 3-mercaptopropyltrimethoxysilane | 1.7 | — | 0.23 | 0.7 | 0.7 |
| Production Example 65 | Natural Rubber E-m | Low-Nitrogen Raw Material 13 | 0.2 | NR | — | — | — | — | — |
| Production Example 66 | Modified Natural Rubber F-a | Low-Nitrogen Raw Material 2 | 0.12 | N,N-diethylaminoethylmethacrylate | 1.8 | 0.31 | — | 0.7 | 0.7 |
| Production Example 67 | Modified Natural Rubber F-b | Low-Nitrogen Raw Material 3 | 0.12 | 2-hydroxyethylmethacrylate | 1.2 | 0.3 | — | 0.7 | 0.7 |
| Production Example 68 | Modified Natural Rubber F-c | Low-Nitrogen Raw Material 4 | 0.12 | 4-vinylpyridine | 0.9 | 0.28 | — | 0.7 | 0.7 |
| Production Example 69 | Modified Natural Rubber F-d | Low-Nitrogen Raw Material 5 | 0.12 | Methacrylic Acid | 0.8 | 0.22 | — | 0.7 | 0.7 |
| Production Example 70 | Modified Natural Rubber F-e | Low-Nitrogen Raw Material 6 | 0.12 | Acrylonitrile | 0.9 | 0.25 | — | 0.7 | 0.7 |
| Production Example 71 | Modified Natural Rubber F-f | Low-Nitrogen Raw Material 7 | 0.12 | Glycidylmethacrylate | 1.3 | 0.25 | — | 0.7 | 0.7 |
| Production Example 72 | Modified Natural Rubber F-g | Low-Nitrogen Raw Material 8 | 0.12 | Methacrylamide | 1.5 | 0.31 | — | 0.7 | 0.7 |
| Production Example 73 | Modified Natural Rubber F-h | Low-Nitrogen Raw Material 9 | 0.12 | N,N-dimethylaminoethanethiol | 0.9 | — | 0.27 | 0.7 | 0.7 |
| Production Example 74 | Modified Natural Rubber F-i | Low-Nitrogen Raw Material 10 | 0.12 | 4-mercaptopyridine | 1 | — | 0.29 | 0.7 | 0.7 |
| Production Example 75 | Modified Natural Rubber F-j | Low-Nitrogen Raw Material 11 | 0.12 | Mercaptoethanol | 0.6 | — | 0.19 | 0.7 | 0.7 |
| Production Example 76 | Modified Natural Rubber F-k | Low-Nitrogen Raw Material 12 | 0.12 | Mercaptoacetic Acid | 0.7 | — | 0.23 | 0.7 | 0.7 |
| Production Example 77 | Modified Natural Rubber F-l | Low-Nitrogen Raw Material 13 | 0.12 | 3-mercaptopropyltrimethoxysilane | 1.7 | — | 0.31 | 0.7 | 0.7 |
| Production Example 78 | Natural Rubber F-m | Low-Nitrogen Raw Material 14 | 0.12 | NR | — | — | — | — | — |

Examples 1 to 96, Comparative Examples 1 to 60

Then, rubber compositions having compounding formulations as shown in Table 2 were prepared by being kneaded in a plastmill, and for these rubber compositions the Mooney viscosity, tensile strength (Tb), tan δ and wear resistance were measured and evaluated in the following way. The results of the rubber compositions according to Formulation 1 are shown in Tables 3-1 and 3-2, and the results of the rubber compositions according to Formulation 2 are shown in Tables 4-1 and 4-2.

(1) Mooney Viscosity

In accordance with JIS K 6300-1994, the Mooney viscosity $ML_{1+4}$ (130° C.) of each rubber composition was measured at 130° C.

The evaluation results are shown in Tables 3 and 4.

(2) Tensile Strength

Tensile test was conducted on the vulcanized rubbers obtained by vulcanizing the rubber compositions at 145° C. for 33 minutes under JIS K6251-2004 to measure tensile strength (Tb). Higher tensile strength represents better fracture resistance.

The evaluation results are shown in Tables 3 and 4.

(3) Low Loss Factor (tan δ)

Regarding the vulcanized rubbers obtained by vulcanizing the rubber compositions at 145° C. for 33 minutes, loss tangent (tan δ) was measured at a temperature of 50° C. with a strain of 5% and a frequency of 15 Hz using a viscoelasticity measuring device (manufactured by RHEOMETRICS Corporation). Smaller tan δ represents better low loss factor.

Figure 2:
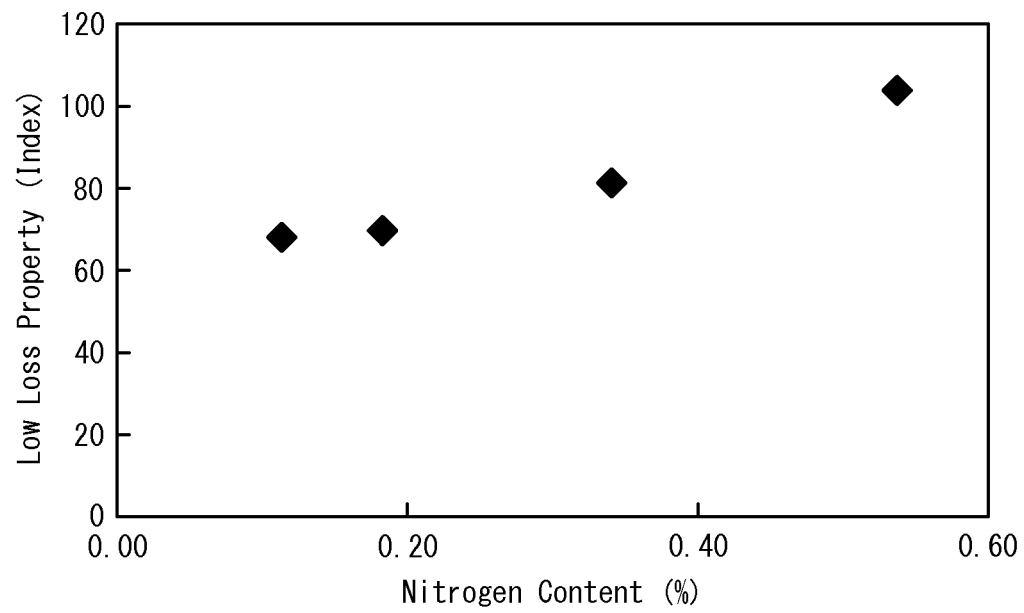
FIG. 2 is a graph illustrating the relationship between the nitrogen content in natural rubber raw materials and the low loss factor in examples and comparative examples.

In addition, the relationship between the nitrogen content and the grafting or attaching amount in the natural rubber raw materials is plotted in FIG. 1 with respect to the samples of Examples 1 and 13 and Comparative Example 1. Further, also plotted in FIG. 2 is the relationship between the nitrogen content and the low loss factor in the natural rubber raw materials with respect to the samples of Examples 1 and 13 and Comparative Example 1. The evaluation results are shown in Tables 3 and 4.

(4) Wear Resistance

Wear resistance was evaluated by measuring the wear loss of the vulcanized rubbers, which were obtained by vulcanizing the rubber compositions at 145° C. for 33 minutes, at room temperature with a slip ratio of 60% using a Lambourn abrasion tester. The results thereof are shown as being indexed with a score of 100 representing: an inverse number of the wear loss of Comparative Example 13 for Comparative Examples 1 to 13; an inverse number of the wear loss of Comparative Example 14 for Examples 1 to 12 and Comparative Example 14; an inverse number of the wear loss of Comparative Example 15 for Examples 13 to 24 and Comparative Example 15; an inverse number of the wear loss of Comparative Example 28 for Comparative Examples 16 to 28; an inverse number of the wear loss of Comparative Example 29 for Examples 25 to 36 and Comparative Example 29; an inverse number of the wear loss of Comparative Example 30 for Examples 37 to 48 and Comparative Example 30; an inverse number of the wear loss of Comparative Example 43 for Comparative Example 31 to 43; an inverse number of the wear loss of Comparative Example 44 for Examples 49 to 60 and Comparative Example 44; an inverse number of the wear loss of Comparative Example 45 for Examples 61 to 72 and Comparative Example 45; an inverse number of the wear loss of Comparative Example 58 for Comparative Examples 46 to 58; an inverse number of the wear loss of Comparative Example 59 for Examples 73 to 84 and Comparative Example 59; and an inverse number of the wear loss of Comparative Example 60 for Examples 85 to 96 and Comparative Example 60. Larger index values represent less wear loss and better wear resistance. The evaluation results are shown in Tables 3 and 4.

TABLE 2

|  | Blending Amount (parts by mass) | |
|---|---|---|
|  | Recipe 1 | Recipe 2 |
| Rubber Component *1 | 100 | 100 |
| Carbon Black N339 | 50 | — |
| Silica *2 | — | 55 |
| Silane Coupling Agent *3 | — | 5.5 |
| Aromatic Oil | 5 | 10 |
| Stearic Acid | 2 | 2 |
| Antioxidant 6C *4 | 1 | 1 |
| Zinc Oxide (Zinc White) | 3 | 3 |
| Vulcanization Accelerator DZ *5 | 0.8 | — |
| Vulcanization Accelerator DPG *6 | — | 1 |
| Vulcanization Accelerator DM *7 | — | 1 |
| Vulcanization Accelerator NS *8 | — | 1 |
| Sulfur | 1 | 1.5 |

In Table 2:
*1: the type of rubber components used are shown in Tables 3-1, 3-2 and Tables 4-1, 4-2 below;
*2: "Nipsil AQ" manufactured by Nippon Silica Co. Ltd;
*3: "Si69," bis(3-triethoxysilylpropyl)tetrasulfide, manufactured by Degussa Corporation;
*4: N-(1,3-dimethylbutyl)-N'-phenyl-p-phenylenediamine;
*5: N,N'-dicyclohexyl-2-benzothiazolylsulfenamide;
*6: diphenylguanidine;
*7: dibenzothiazyl disulphide; and
*8: N-t-butyl-2-benzothiazolylsulfenamide.

TABLE 3-1

Recipe 1

| No. | Compounding Recipe | Rubber Component | Mooney Viscosity ML1 + 4 (130° C.) | Tb (MPa) | tand | Wear Resistance (Index) |
|---|---|---|---|---|---|---|
| Comparative Example 1 | Recipe 1 | Modified Natural Rubber A-a | 79 | 28.6 | 0.19 | 101 |
| Comparative Example 2 |  | Modified Natural Rubber A-b | 79 | 28.6 | 0.194 | 100 |
| Comparative Example 3 |  | Modified Natural Rubber A-c | 73 | 28.5 | 0.19 | 100 |
| Comparative Example 4 |  | Modified Natural Rubber A-d | 80 | 28.2 | 0.184 | 100 |
| Comparative Example 5 |  | Modified Natural Rubber A-e | 76 | 28.3 | 0.191 | 100 |
| Comparative Example 6 |  | Modified Natural Rubber A-f | 77 | 28.6 | 0.191 | 100 |
| Comparative Example 7 |  | Modified Natural Rubber A-g | 78 | 28.4 | 0.184 | 102 |
| Comparative Example 8 |  | Modified Natural Rubber A-h | 79 | 28.4 | 0.196 | 100 |
| Comparative Example 9 |  | Modified Natural Rubber A-i | 71 | 28.7 | 0.186 | 100 |
| Comparative Example 10 |  | Modified Natural Rubber A-j | 77 | 28.5 | 0.196 | 100 |
| Comparative Example 11 |  | Modified Natural Rubber A-k | 78 | 28.7 | 0.193 | 100 |

TABLE 3-1-continued

Recipe 1

| No. | Compounding Recipe | Rubber Component | Mooney Viscosity ML1 + 4 (130° C.) | Tb (MPa) | tanδ | Wear Resistance (Index) |
|---|---|---|---|---|---|---|
| Comparative Example 12 | | Modified Natural Rubber A-l | 78 | 28.3 | 0.185 | 102 |
| Comparative Example 13 | | Natural Rubber A-m | 76 | 28.4 | 0.191 | 100 |
| Example 1 | | Modified Natural Rubber B-a | 67 | 27 | 0.136 | 116 |
| Example 2 | | Modified Natural Rubber B-b | 66 | 27.2 | 0.151 | 117 |
| Example 3 | | Modified Natural Rubber B-c | 60 | 27 | 0.154 | 113 |
| Example 4 | | Modified Natural Rubber B-d | 68 | 26.9 | 0.149 | 113 |
| Example 5 | | Modified Natural Rubber B-e | 65 | 27.2 | 0.145 | 114 |
| Example 6 | | Modified Natural Rubber B-f | 64 | 27.1 | 0.128 | 113 |
| Example 7 | | Modified Natural Rubber B-g | 66 | 27.1 | 0.12 | 115 |
| Example 8 | | Modified Natural Rubber B-h | 69 | 27.4 | 0.137 | 112 |
| Example 9 | | Modified Natural Rubber B-i | 60 | 27.2 | 0.145 | 114 |
| Example 10 | | Modified Natural Rubber B-j | 65 | 26.3 | 0.152 | 109 |
| Example 11 | | Modified Natural Rubber B-k | 66 | 27 | 0.146 | 112 |
| Example 12 | | Modified Natural Rubber B-l | 67 | 26.8 | 0.146 | 113 |
| Comparative Example 14 | | Natural Rubber B-m | 64 | 25.7 | 0.183 | 100 |
| Example 13 | | Modified Natural Rubber C-a | 69 | 29 | 0.102 | 120 |
| Example 14 | | Modified Natural Rubber C-b | 69 | 28.2 | 0.108 | 126 |
| Example 15 | | Modified Natural Rubber C-c | 62 | 28.2 | 0.107 | 123 |
| Example 16 | | Modified Natural Rubber C-d | 70 | 27.7 | 0.121 | 113 |
| Example 17 | | Modified Natural Rubber C-e | 66 | 28 | 0.134 | 122 |
| Example 18 | | Modified Natural Rubber C-f | 66 | 28.3 | 0.119 | 116 |
| Example 19 | | Modified Natural Rubber C-g | 68 | 28.3 | 0.104 | 123 |
| Example 20 | | Modified Natural Rubber C-h | 70 | 29 | 0.116 | 118 |
| Example 21 | | Modified Natural Rubber C-i | 62 | 29 | 0.115 | 127 |
| Example 22 | | Modified Natural Rubber C-j | 67 | 27.7 | 0.137 | 113 |
| Example 23 | | Modified Natural Rubber C-k | 67 | 28.3 | 0.12 | 119 |
| Example 24 | | Modified Natural Rubber C-l | 68 | 29.9 | 0.103 | 130 |
| Comparative Example 15 | | Natural Rubber C-m | 66 | 26.9 | 0.161 | 100 |

TABLE 3-2

Recipe 2

| No. | Compounding Recipe | Rubber Component | Mooney Viscosity ML1 + 4 (130° C.) | Tb (MPa) | tanδ | Wear Resistance (Index) |
|---|---|---|---|---|---|---|
| Comparative Example 16 | Recipe 2 | Modified Natural Rubber A-a | 86 | 26.5 | 0.145 | 101 |
| Comparative Example 17 | | Modified Natural Rubber A-b | 83 | 26.5 | 0.142 | 100 |
| Comparative Example 18 | | Modified Natural Rubber A-c | 73 | 26.3 | 0.146 | 100 |
| Comparative Example 19 | | Modified Natural Rubber A-d | 83 | 26.6 | 0.143 | 100 |
| Comparative Example 20 | | Modified Natural Rubber A-e | 83 | 26.1 | 0.146 | 100 |
| Comparative Example 21 | | Modified Natural Rubber A-f | 79 | 26.3 | 0.152 | 100 |
| Comparative Example 22 | | Modified Natural Rubber A-g | 82 | 26.2 | 0.137 | 102 |
| Comparative Example 23 | | Modified Natural Rubber A-h | 84 | 26.3 | 0.141 | 100 |
| Comparative Example 24 | | Modified Natural Rubber A-i | 73 | 26.4 | 0.152 | 100 |
| Comparative Example 25 | | Modified Natural Rubber A-j | 79 | 26.5 | 0.143 | 100 |
| Comparative Example 26 | | Modified Natural Rubber A-k | 83 | 26.1 | 0.147 | 100 |
| Comparative Example 27 | | Modified Natural Rubber A-l | 84 | 26.2 | 0.145 | 101 |
| Comparative Example 28 | | Natural Rubber A-m | 79 | 26.3 | 0.145 | 100 |
| Example 25 | | Modified Natural Rubber B-a | 78 | 26.2 | 0.097 | 111 |
| Example 26 | | Modified Natural Rubber B-b | 73 | 26.3 | 0.099 | 113 |
| Example 27 | | Modified Natural Rubber B-c | 66 | 25.5 | 0.104 | 110 |
| Example 28 | | Modified Natural Rubber B-d | 74 | 25.9 | 0.114 | 109 |
| Example 29 | | Modified Natural Rubber B-e | 73 | 25.9 | 0.1 | 113 |
| Example 30 | | Modified Natural Rubber B-f | 70 | 26.2 | 0.101 | 123 |
| Example 31 | | Modified Natural Rubber B-g | 77 | 26.2 | 0.088 | 125 |
| Example 32 | | Modified Natural Rubber B-h | 76 | 25.6 | 0.107 | 118 |
| Example 33 | | Modified Natural Rubber B-i | 66 | 26.1 | 0.093 | 120 |
| Example 34 | | Modified Natural Rubber B-j | 74 | 25.3 | 0.115 | 107 |
| Example 35 | | Modified Natural Rubber B-k | 72 | 25.7 | 0.113 | 109 |
| Example 36 | | Modified Natural Rubber B-l | 75 | 26 | 0.1005 | 114 |
| Comparative Example 29 | | Natural Rubber B-m | 71 | 24.7 | 0.129 | 100 |
| Example 37 | | Modified Natural Rubber C-a | 80 | 27.4 | 0.086 | 119 |
| Example 38 | | Modified Natural Rubber C-b | 75 | 26.6 | 0.079 | 127 |
| Example 39 | | Modified Natural Rubber C-c | 72 | 26.9 | 0.086 | 124 |
| Example 40 | | Modified Natural Rubber C-d | 75 | 27.2 | 0.088 | 112 |
| Example 41 | | Modified Natural Rubber C-e | 75 | 27.7 | 0.091 | 123 |
| Example 42 | | Modified Natural Rubber C-f | 76 | 27.7 | 0.073 | 125 |

TABLE 3-2-continued

Recipe 2

| No. | Compounding Recipe | Rubber Component | Mooney Viscosity ML1 + 4 (130° C.) | Tb (MPa) | tanδ | Wear Resistance (Index) |
|---|---|---|---|---|---|---|
| Example 43 | | Modified Natural Rubber C-g | 79 | 27.1 | 0.07 | 116 |
| Example 44 | | Modified Natural Rubber C-h | 79 | 27.8 | 0.074 | 122 |
| Example 45 | | Modified Natural Rubber C-i | 70 | 27.3 | 0.078 | 119 |
| Example 46 | | Modified Natural Rubber C-j | 77 | 26.9 | 0.085 | 113 |
| Example 47 | | Modified Natural Rubber C-k | 75 | 26.9 | 0.089 | 112 |
| Example 48 | | Modified Natural Rubber C-l | 79 | 27.7 | 0.063 | 127 |
| Comparative Example 30 | | Natural Rubber C-m | 74 | 25.5 | 0.11 | 100 |

TABLE 4-1

Recipe 1

| No. | Compounding Recipe | Rubber Component | Mooney Viscosity ML1 + 4 (130° C.) | Tb (MPa) | tanδ | Wear Resistance (Index) |
|---|---|---|---|---|---|---|
| Comparative Example 31 | Recipe 1 | Modified Natural Rubber D-a | 79 | 28.5 | 0.185 | 101 |
| Comparative Example 32 | | Modified Natural Rubber D-b | 79 | 28.6 | 0.197 | 100 |
| Comparative Example 33 | | Modified Natural Rubber D-c | 72 | 28.4 | 0.189 | 100 |
| Comparative Example 34 | | Modified Natural Rubber D-d | 80 | 28.6 | 0.194 | 100 |
| Comparative Example 35 | | Modified Natural Rubber D-e | 76 | 28.2 | 0.184 | 100 |
| Comparative Example 36 | | Modified Natural Rubber D-f | 76 | 28.6 | 0.185 | 100 |
| Comparative Example 37 | | Modified Natural Rubber D-g | 78 | 28.9 | 0.189 | 102 |
| Comparative Example 38 | | Modified Natural Rubber D-h | 79 | 28.2 | 0.199 | 100 |
| Comparative Example 39 | | Modified Natural Rubber D-i | 72 | 28.3 | 0.185 | 100 |
| Comparative Example 40 | | Modified Natural Rubber D-j | 76 | 28.7 | 0.186 | 100 |
| Comparative Example 41 | | Modified Natural Rubber D-k | 77 | 28.6 | 0.197 | 100 |
| Comparative Example 42 | | Modified Natural Rubber D-l | 80 | 28.3 | 0.185 | 101 |
| Comparative Example 43 | | Natural Rubber D-m | 76 | 28.4 | 0.191 | 100 |
| Example 49 | | Modified Natural Rubber E-a | 68 | 27.7 | 0.155 | 122 |
| Example 50 | | Modified Natural Rubber E-b | 67 | 27.5 | 0.156 | 114 |
| Example 51 | | Modified Natural Rubber E-c | 60 | 26.8 | 0.149 | 117 |
| Example 52 | | Modified Natural Rubber E-d | 67 | 26.7 | 0.168 | 108 |
| Example 53 | | Modified Natural Rubber E-e | 64 | 26.6 | 0.16 | 115 |
| Example 54 | | Modified Natural Rubber E-f | 65 | 27.1 | 0.143 | 115 |
| Example 55 | | Modified Natural Rubber E-g | 66 | 28 | 0.14 | 120 |
| Example 56 | | Modified Natural Rubber E-h | 68 | 27.4 | 0.158 | 113 |
| Example 57 | | Modified Natural Rubber E-i | 60 | 27.1 | 0.143 | 119 |
| Example 58 | | Modified Natural Rubber E-j | 66 | 26.7 | 0.158 | 112 |
| Example 59 | | Modified Natural Rubber E-k | 66 | 26.9 | 0.153 | 109 |
| Example 60 | | Modified Natural Rubber E-l | 67 | 26.7 | 0.149 | 116 |
| Comparative Example 44 | | Natural Rubber E-m | 64 | 25.7 | 0.192 | 100 |
| Example 61 | | Modified Natural Rubber F-a | 68 | 28.2 | 0.103 | 127 |
| Example 62 | | Modified Natural Rubber F-b | 66 | 28.2 | 0.132 | 118 |
| Example 63 | | Modified Natural Rubber F-c | 60 | 28.1 | 0.122 | 123 |
| Example 64 | | Modified Natural Rubber F-d | 66 | 28 | 0.133 | 119 |
| Example 65 | | Modified Natural Rubber F-e | 66 | 27.1 | 0.132 | 125 |
| Example 66 | | Modified Natural Rubber F-f | 64 | 28.3 | 0.133 | 116 |
| Example 67 | | Modified Natural Rubber F-g | 66 | 29 | 0.119 | 129 |
| Example 68 | | Modified Natural Rubber F-h | 68 | 27.6 | 0.129 | 119 |
| Example 69 | | Modified Natural Rubber F-i | 60 | 28.1 | 0.129 | 123 |
| Example 70 | | Modified Natural Rubber F-j | 65 | 27.2 | 0.128 | 110 |
| Example 71 | | Modified Natural Rubber F-k | 66 | 27.2 | 0.122 | 115 |
| Example 72 | | Modified Natural Rubber F-l | 67 | 28.1 | 0.101 | 127 |
| Comparative Example 45 | | Natural Rubber F-m | 64 | 26.1 | 0.168 | 100 |

TABLE 4-2

Recipe 2

| No. | Compounding Recipe | Rubber Component | Mooney Viscosity ML1 + 4 (130° C.) | Tb (MPa) | tand | Wear Resistance (Index) |
|---|---|---|---|---|---|---|
| Comparative Example 46 | Recipe 2 | Modified Natural Rubber D-a | 85 | 26.1 | 0.144 | 101 |
| Comparative Example 47 | | Modified Natural Rubber D-b | 83 | 26.1 | 0.143 | 100 |
| Comparative Example 48 | | Modified Natural Rubber D-c | 75 | 26 | 0.143 | 100 |
| Comparative Example 49 | | Modified Natural Rubber D-d | 80 | 26 | 0.149 | 100 |
| Comparative Example 50 | | Modified Natural Rubber D-e | 80 | 26.2 | 0.145 | 100 |
| Comparative Example 51 | | Modified Natural Rubber D-f | 81 | 26.4 | 0.14 | 100 |
| Comparative Example 52 | | Modified Natural Rubber D-g | 85 | 26.5 | 0.142 | 102 |
| Comparative Example 53 | | Modified Natural Rubber D-h | 83 | 26.5 | 0.145 | 100 |
| Comparative Example 54 | | Modified Natural Rubber D-i | 73 | 26.3 | 0.144 | 100 |
| Comparative Example 55 | | Modified Natural Rubber D-j | 79 | 26.6 | 0.137 | 100 |
| Comparative Example 56 | | Modified Natural Rubber D-k | 83 | 26.1 | 0.143 | 100 |
| Comparative Example 57 | | Modified Natural Rubber D-l | 83 | 26.2 | 0.147 | 101 |
| Comparative Example 58 | | Natural Rubber D-m | 79 | 26.3 | 0.145 | 100 |
| Example 73 | | Modified Natural Rubber E-a | 79 | 25.9 | 0.112 | 118 |
| Example 74 | | Modified Natural Rubber E-b | 72 | 26.3 | 0.1 | 117 |
| Example 75 | | Modified Natural Rubber E-c | 68 | 25.9 | 0.103 | 111 |
| Example 76 | | Modified Natural Rubber E-d | 74 | 25.5 | 0.102 | 109 |
| Example 77 | | Modified Natural Rubber E-e | 73 | 25.5 | 0.095 | 117 |
| Example 78 | | Modified Natural Rubber E-f | 72 | 26.3 | 0.107 | 118 |
| Example 79 | | Modified Natural Rubber E-g | 76 | 25.7 | 0.091 | 124 |
| Example 80 | | Modified Natural Rubber E-h | 74 | 25.9 | 0.105 | 109 |
| Example 81 | | Modified Natural Rubber E-i | 65 | 26.4 | 0.1 | 112 |
| Example 82 | | Modified Natural Rubber E-j | 74 | 25.7 | 0.107 | 111 |
| Example 83 | | Modified Natural Rubber E-k | 73 | 25.5 | 0.116 | 113 |
| Example 84 | | Modified Natural Rubber E-l | 77 | 26.1 | 0.098 | 121 |
| Comparative Example 59 | | Natural Rubber E-m | 71 | 24.7 | 0.129 | 100 |
| Example 85 | | Modified Natural Rubber F-a | 77 | 26.8 | 0.071 | 121 |
| Example 86 | | Modified Natural Rubber F-b | 76 | 26 | 0.091 | 129 |
| Example 87 | | Modified Natural Rubber F-c | 68 | 27.1 | 0.08 | 127 |
| Example 88 | | Modified Natural Rubber F-d | 73 | 26.8 | 0.084 | 111 |
| Example 89 | | Modified Natural Rubber F-e | 75 | 27 | 0.094 | 118 |
| Example 90 | | Modified Natural Rubber F-f | 71 | 26.3 | 0.087 | 117 |
| Example 91 | | Modified Natural Rubber F-g | 75 | 27.2 | 0.066 | 122 |
| Example 92 | | Modified Natural Rubber F-h | 76 | 26.8 | 0.082 | 117 |
| Example 93 | | Modified Natural Rubber F-i | 66 | 26.3 | 0.077 | 125 |
| Example 94 | | Modified Natural Rubber F-j | 74 | 26 | 0.096 | 114 |
| Example 95 | | Modified Natural Rubber F-k | 75 | 25.7 | 0.077 | 118 |
| Example 96 | | Modified Natural Rubber F-l | 76 | 27.6 | 0.088 | 130 |
| Comparative Example 60 | | Natural Rubber F-m | 72 | 24.8 | 0.113 | 100 |

It can be seen from the comparison of the examples with the comparative examples in Tables 3 and 4 that the use of the modified natural rubber, rather than natural rubber, modified with a polar group-containing compound may significantly improve the fracture resistance, low loss factor and wear resistance of the rubber compositions.

It is also found from FIG. 1 that DEMA increases with decreasing nitrogen content in the natural rubber raw material, resulting in improved efficiency of graft reaction. Moreover, it is apparent from FIG. 2 that the lower the nitrogen content in the natural rubber raw material, the better low loss factor the resulting rubber composition has.

Examples 97 to 103, Comparative Examples 61 to 63

Comparative Examples 61 to 63

A modified natural rubber according to Comparative Example 61 was obtained under the same conditions as Production Example 1, except that a polymerization initiator shown in Table 5 below was used as a polymerization initiator in place of the polymerization initiator of Production Example 1. Further, modified natural rubbers according to Comparative Examples 62 and 63 were obtained under the same conditions as Production Example 1, except that polymerization initiators shown in Table 5 were used as polymerization initiators in place of the polymerization initiators of Production Example 1, and that the mixtures were extruded without adding tetraethylenepentamine (TEPA).

Examples 97 to 99

In addition, a modified natural rubber according to Example 97 was obtained under the same conditions as Production Example 1, except that a polymerization initiator shown in Table 5 was used as a polymerization initiator in place of the polymerization initiator of Production Example 14. Furthermore, modified natural rubbers according to Examples 98 and 99 were obtained under the same conditions as Production Example 14, except that polymerization initiators shown in Table 5 were used as polymerization initiators in place of the polymerization initiator of Production Example 14, and that the mixtures were extruded without adding tetraethylenepentamine (TEPA).

Examples 100 to 103

In addition, a modified natural rubber according to Example 100 was obtained under the same conditions as Production Example 1, except that a polymerization initiator shown in Table 5 was used as a polymerization initiator in place of the polymerization initiator of Production Example 27. Furthermore, modified natural rubbers according to Examples 101 to 103 were obtained under the same conditions as Production Example 1, except that polymerization initiators shown in Table 5 per were used in place of the polymerization initiator of Production Example 27, and that the mixtures were extruded without adding tetraethylenepentamine (TEPA).

(1) Gel Content in the Modified Natural Rubber

Then, 200 mg of each sample of the resulting modified natural rubbers was dissolved in toluene and left overnight (10 hours). The product was then subjected to a centrifugal separation process (rotational speed: 3500 rpm, duration: 1.5 H). Subsequently, the supernatant formed during the process was removed and the mass of the residual gel was measured, which was determined as the gel content in each modified natural rubber. A ratio of the grafting amount (attaching amount of DEMA) to the gel content (attaching amount of DEMA/increase in gel content×100) is also shown in Table 5.

(3) Workability

Each of the resulting modified natural rubbers was analyzed in accordance with JIS-K6300-1:2001 using a Mooney viscometer (RPA manufactured by Monsanto Company) with the use of an L-type rotor to measure the Mooney viscosity [$ML_1$+4 (130° C.)] of each unvulcanized rubber composition at 130° C.

The obtained measurements of the Mooney viscosity of each unvulcanized rubber composition are shown in Table 5, as being indexed with a score of 100 representing the measurement of Comparative Example 1. A smaller index represents better flow characteristics and better workability of the unvulcanized rubber composition.

TABLE 5

| | Polymerization Initiator | | | Attaching Amount of DEMA/Increase | |
|---|---|---|---|---|---|
| | Type | Trade Name | Raw Material | in Gel Content | Workability |
| Example 97 | t-butyl hydroperoxide | Perbutyl H-69 | Low Nitrogen 1 | 115 | 88 |
| Example 98 | 1,1,3,3-tetramethylbutyl hydroperoxide | Perocta H | Low Nitrogen 1 | 140 | 81 |
| Example 99 | 1,1,3,3-tetramethylbutylperoxy-2-ethylhexanoate | Perocta O | Low Nitrogen 1 | 151 | 83 |
| Example 100 | t-butyl hydroperoxide | Perbutyl H-69 | SIR20 | 100 | 99 |
| Example 101 | 1,1,3,3-tetramethylbutyl hydroperoxide | Perocta H | SIR20 | 120 | 90 |
| Example 102 | 1,1,3,3-tetramethylbutylperoxy-2-ethylhexanoate | Perocta O | SIR20 | 128 | 85 |
| Example 103 | t-hexylperoxy-2-ethylhexanoate | Perhexyl O | SIR20 | 107 | 93 |
| Comparative Example 61 | t-butyl hydroperoxide | Perbutyl H-69 | RSS | 10 | 120 |
| Comparative Example 62 | 1,1,3,3-tetramethylbutyl hydroperoxide | Perocta H | RSS | 42 | 108 |
| Comparative Example 63 | 1,1,3,3-tetramethylbutylperoxy-2-ethylhexanoate | Perocta O | RSS | 51 | 107 |

INDUSTRIAL APPLICABILITY

According to the present invention, it is possible to provide a modified natural rubber that offers higher efficiency of graft polymerization or attachment of polar group-containing compounds, and that possesses excellent low loss factor, wear resistance and fracture resistance when used as a rubber composition, and a method of manufacturing the same. In addition, tires using the rubber composition containing the modified natural rubber are useful in industrial application in terms of their excellent low loss factor, wear resistance and fracture resistance.

The invention claimed is:

1. A modified natural rubber formed by graft polymerizing or attaching a polar group-containing compound to at least one natural rubber raw material selected from the group consisting of natural rubber, a natural rubber latex coagulation and a natural rubber cup lump under mechanical shear force,
   wherein the modified natural rubber includes 1,1,3,3-tetramethylbutylperoxy-2-ethylhexanoate as a polymerization initiator,
   wherein the natural rubber raw material has a nitrogen content of 0.4 mass % or less, and
   wherein the polar group-containing compound has at least one polar group selected from the group consisting of amino group, imino group, nitrile group, ammonium group, imido group, amido group, hydrazo group, azo group, diazo group, hydroxyl group, carboxyl group, carbonyl group, epoxy group, oxycarbonyl group, nitrogen-containing heterocyclic group, oxygen-containing heterocyclic group, tin-containing group and alkoxysilyl group.

2. The modified natural rubber according to claim 1, wherein a grafting or attaching amount of the polar group-containing compound is 0.01 to 5.0 parts by mass per 100 parts by mass of the solid rubber component in the natural rubber raw material.

3. A method of manufacturing a modified natural rubber, comprising: graft polymerizing or attaching a polar group-containing compound to at least one natural rubber raw material selected from the group consisting of natural rubber, a natural rubber latex coagulation and a natural rubber cup lump under mechanical shear force,
   wherein the modified natural rubber includes 1,1,3,3-tetramethylbutylperoxy-2-ethylhexanoate as a polymerization initiator,
   wherein the natural rubber raw material has a nitrogen content of 0.4 mass % or less, and
   wherein the polar group-containing compound has at least one polar group selected from the group consisting of amino group, imino group, nitrile group, ammonium group, imido group, amido group, hydrazo group, azo group, diazo group, hydroxyl group, carboxyl group, carbonyl group, epoxy group, oxycarbonyl group, nitrogen-containing heterocyclic group, oxygen-containing heterocyclic group, tin-containing group and alkoxysilyl group.

4. A rubber composition using the modified natural rubber according to claim 1.

5. A tire comprising tire members and using the rubber composition according to claim 4 in any of the tire members.

* * * * *